United States Patent
Ko (10) Patent No.: US 12,109,986 B2
(45) Date of Patent: Oct. 8, 2024

(54) BRAKING SYSTEM OF VEHICLE CAPABLE OF REGENERATIVE BRAKING AND HYDRAULIC BRAKING AND METHOD OF CONTROLLING THE SAME

(71) Applicant: HYUNDAI MOBIS Co., Ltd., Seoul (KR)

(72) Inventor: Ji Weon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 386 days.

(21) Appl. No.: 17/582,288

(22) Filed: Jan. 24, 2022

(65) Prior Publication Data
US 2022/0234562 A1 Jul. 28, 2022

(30) Foreign Application Priority Data
Jan. 25, 2021 (KR) ........................ 10-2021-0010068

(51) Int. Cl.
*B60T 13/58* (2006.01)
*B60L 7/26* (2006.01)
*B60T 13/74* (2006.01)

(52) U.S. Cl.
CPC .............. *B60T 13/586* (2013.01); *B60L 7/26* (2013.01); *B60T 13/745* (2013.01); *B60T 2270/402* (2013.01); *B60T 2270/404* (2013.01); *B60T 2270/604* (2013.01); *B60T 2270/82* (2013.01)

(58) Field of Classification Search
CPC .... B60T 13/586; B60T 13/585; B60T 13/745; B60T 2270/402; B60T 2270/404; B60T 2270/604; B60T 2270/82; B60L 7/26
See application file for complete search history.

(56) References Cited

U.S. PATENT DOCUMENTS

| 12,043,237 B2* | 7/2024 | Ko | B60T 13/745 |
| 2008/0210497 A1 | 9/2008 | Jeon | |
| 2011/0178687 A1* | 7/2011 | Anderson | B60T 13/745 701/70 |
| 2012/0031692 A1* | 2/2012 | Koike | B60T 13/586 903/902 |

(Continued)

FOREIGN PATENT DOCUMENTS

| CN | 101117094 A | 2/2008 |
| CN | 105150858 A | 12/2015 |

(Continued)

OTHER PUBLICATIONS

Chinese Office Action dated Jun. 13, 2023, issued in corresponding Chinese Patent Application No. 202210088113.6.

*Primary Examiner* — Thomas J Williams
(74) *Attorney, Agent, or Firm* — Morgan, Lewis & Bockius LLP (57) ABSTRACT

The present disclosure in at least one embodiment provides a braking system comprising: a pedal master unit; an electric booster unit; a reaction disc that generates a pedal force when compressed by at least one of the operating rod or the motor piston; and a controller that, upon receiving a regenerative braking interruption signal during the cooperative braking of the vehicle, senses a pressure change in the master cylinder and compensates for a displacement of the motor piston by an amount corresponding to the pressure change.

10 Claims, 5 Drawing Sheets

(56) References Cited

U.S. PATENT DOCUMENTS

| | | | |
|---|---|---|---|
| 2014/0202145 A1* | 7/2014 | Kuramochi | B60T 13/745 |
| | | | 60/327 |
| 2017/0297545 A1 | 10/2017 | Kim | |
| 2019/0315322 A1* | 10/2019 | Goto | B60T 7/12 |
| 2019/0381982 A1* | 12/2019 | Bull | B60T 8/96 |
| 2020/0262409 A1 | 8/2020 | Takahashi et al. | |
| 2021/0078555 A1* | 3/2021 | Kim | B60T 13/142 |
| 2022/0134888 A1* | 5/2022 | Ko | B60T 8/4081 |
| | | | 303/3 |
| 2022/0234562 A1* | 7/2022 | Ko | B60L 7/26 |
| 2022/0262409 A1* | 8/2022 | Lin | G11C 29/028 |
| 2022/0314944 A1* | 10/2022 | Ko | B60T 7/122 |

FOREIGN PATENT DOCUMENTS

| | | |
|---|---|---|
| CN | 107444381 A | 12/2017 |
| CN | 114604216 A | 6/2022 |
| JP | 2012-131299 A | 7/2012 |

\* cited by examiner

BRAKING SYSTEM OF VEHICLE CAPABLE OF REGENERATIVE BRAKING AND HYDRAULIC BRAKING AND METHOD OF CONTROLLING THE SAME

CROSS REFERENCE

This application claims the benefit of priority to Korean Patent Application No. 10-2021-0010068 filed in the Korean Intellectual Property Office on Jan. 25, 2021, the entire contents of each are hereby incorporated by reference.

TECHNICAL FIELD

The present disclosure relates to a braking system of a vehicle capable of regenerative braking and hydraulic braking and a method of controlling the same.

BACKGROUND

The statements in this section merely provide background information on the present disclosure and do not necessarily constitute related art.

Regenerative braking is a way of braking that drives a motor as a generator using the driving inertia of a vehicle and uses a resistance produced by driving the motor as a braking force.

In the case of a hybrid electric vehicle (HEV), a regenerative braking unit and a hydraulic braking unit cooperate to brake the vehicle (hereinafter, "cooperative braking"), thereby providing stable braking force to the vehicle.

The vehicle further includes an electric booster unit in order to boost a driver's pedal effort. The electric booster unit uses rotational torque of an electric motor provided in the electric booster unit to boost a force applied to the inside of a master cylinder from an operating rod. Also, when generating a pedal force, the electric booster unit is configured to give the driver a required pedal feel. Specifically, the electric booster unit is configured to generate a proper amount of pedal force corresponding to a pedal stroke as a reaction disc is compressed by the electric booster unit.

Meanwhile, when a vehicle with a conventional cooperative braking function performs regenerative braking, electronic stability control (ESC) is used to reduce hydraulic pressure by an amount compensated by regenerative braking during regenerative braking. To this end, conventional vehicles require ESC with a specification that enables cooperative control of regenerative braking and hydraulic braking. Specifically, ESC requires a pressure reducing device such as an accumulator in order to reduce hydraulic pressure, which requires a higher specification for ESC. This may lead to a cost increase.

Moreover, when regenerative braking is disabled while a vehicle with a conventional cooperative braking function is in the midst of cooperative braking, the amount of hydraulic oil in the braking system is increased using ESC, in order to increase the braking force of hydraulic braking. A pump is activated to draw oil from the master cylinder in order to increase the amount of hydraulic oil in the braking system. As a result, the pressure generated inside the master cylinder is reduced, and the driver will have an unnatural feel that the pedal force is lowered.

SUMMARY

In view of the above, the present disclosure primarily aims to minimize the driver's unnatural feel on the brake when regenerative braking is disabled during cooperative braking.

The problems to be solved in the present disclosure are not limited to the foregoing problems, and other problems not mentioned herein would be clearly understood by one of ordinary skill in the art from the following description.

As explained above, according to this embodiment, the braking system allows a motor piston to move backward while the hydraulic pressure in the master cylinder is temporarily reduced, when regenerative braking is disabled during cooperative braking, thereby minimizing the driver's unnatural feel on the brake.

DETAILED DESCRIPTION

Figure 1:
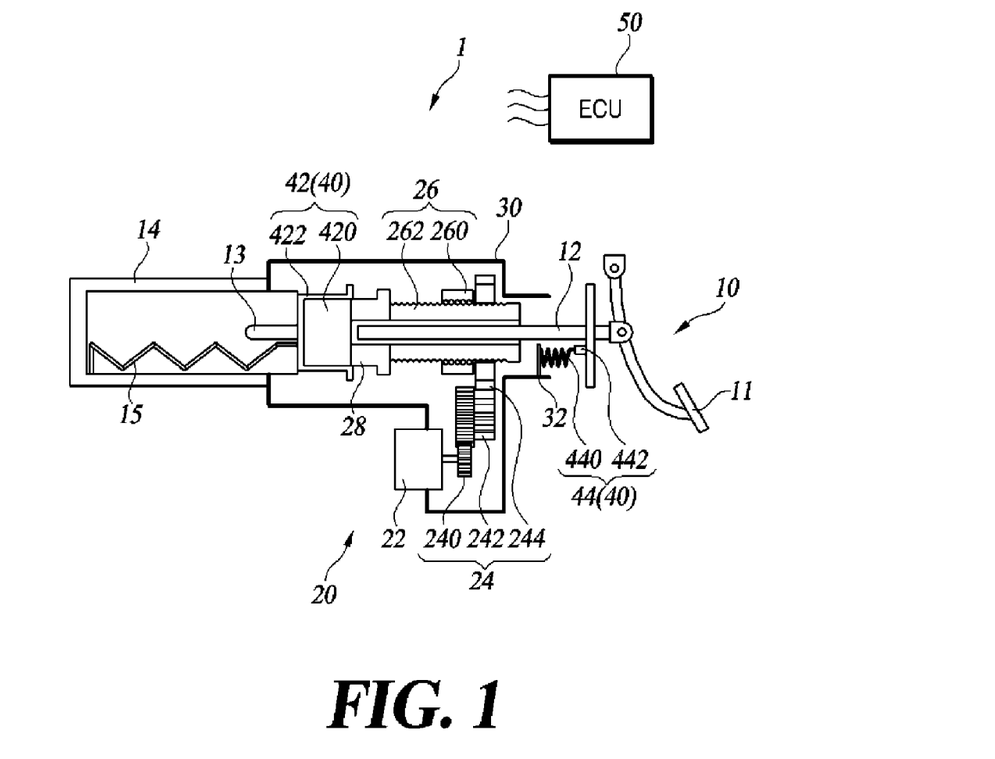
FIG. 1 is a cross-sectional view of a braking system according to an embodiment of the present disclosure.
Figure 2:
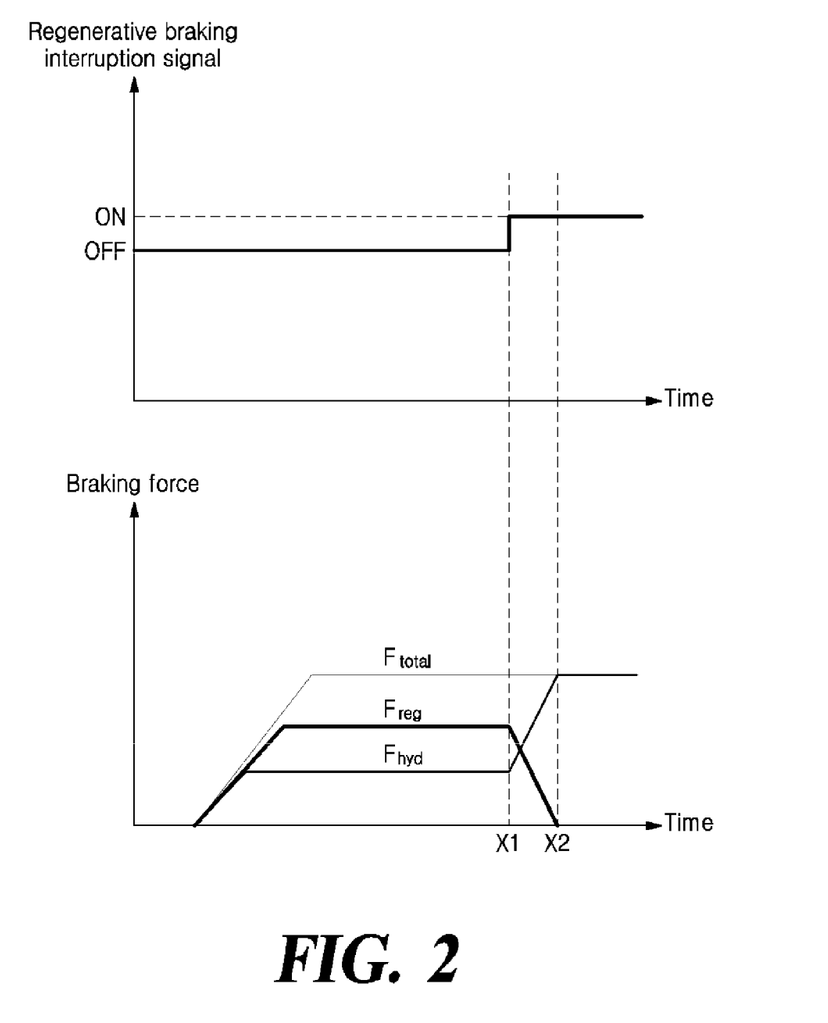
FIG. 2 is a graph for explaining how the operation works when the braking system brakes the vehicle in a cooperative braking mode.
Figure 3A:
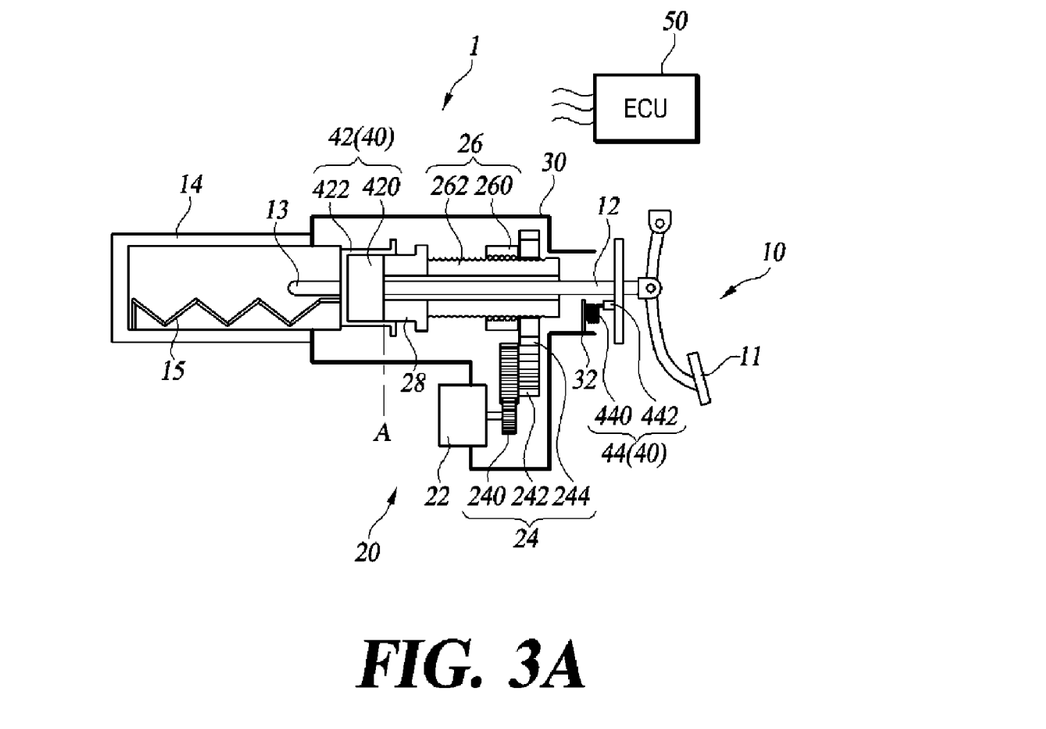
FIG. 3A and FIG. 3B are a cross-sectional view for explaining how the operation works when a regenerative braking interrupt signal is received in the cooperative braking mode of the braking system according to an embodiment of the present disclosure.
Figure 3B:
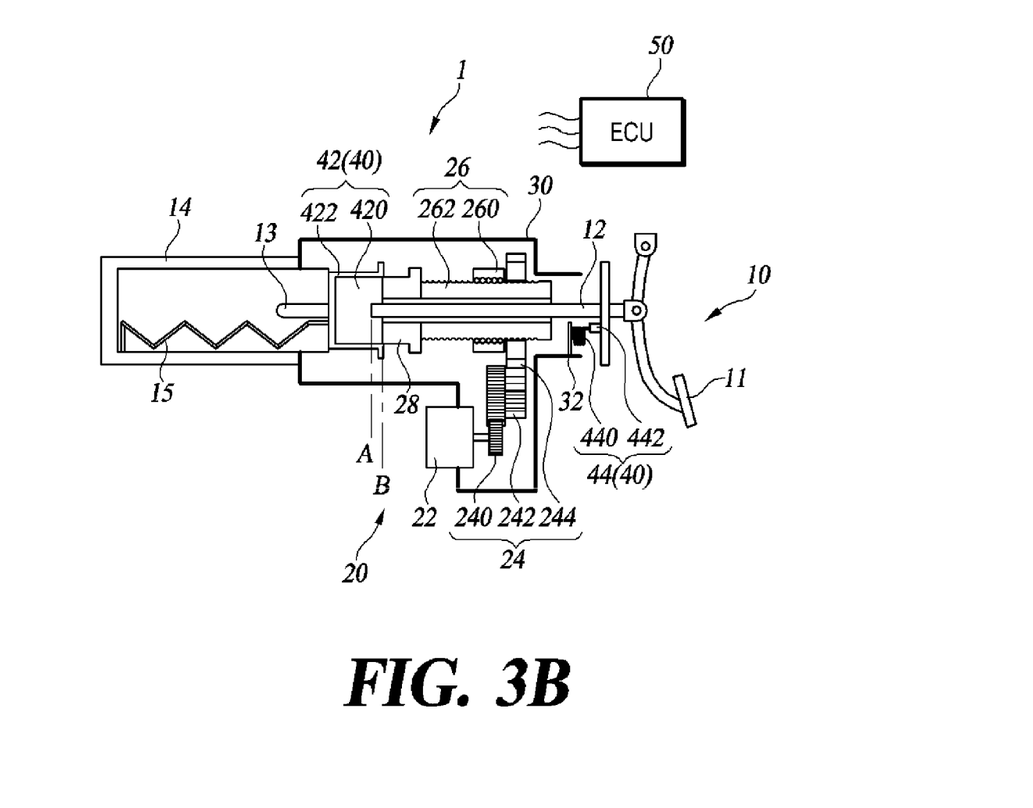

A conceptual diagram of the braking system 1 depicted in FIGS. 1 to 3 in the present disclosure is a simplified view of how the braking system 1 works for ease of comprehension, and it should be noted that there might be differences with a concrete shape of an actual braking system 1.

FIG. 1 is a cross-sectional view of a braking system according to an embodiment of the present disclosure.

Referring to FIG. 1, a braking system 1 according to an embodiment of the present disclosure includes all or part of a pedal master unit 10, an electric booster unit 20, a housing 30, a pedal feel generating unit 40, and an electric control unit 50 (e.g., a controller).

The pedal master unit 10 is configured to transmit a pedaling force to a master cylinder 14 when a pedal 11 is applied by the driver. The pedal master unit 10 includes all or part of the pedal 11, an operating rod 12, a push rod 13, the master cylinder 14, and a return spring 15.

The pedal 11 is a part the driver pushes to slow or stop the vehicle. When the driver presses the pedal 11 to apply a certain amount of pressure or higher to one end of the operating rod 12, the other end of the operating rod 12 compresses the reaction disc 32. In this case, a stroke of the pedal 11 is sensed by a pedal travel sensor (not shown) which is provided separately. The one end of the operating rod 12 may be disposed to abut a central part of the reaction disc 420.

The operating rod 12 is a medium by which the driver's pedal effort is transmitted to the reaction disc 420. The one end of the operating rod 12 is connected to the pedal 11. The pedal effort $F_{RD}$ transmitted to the reaction disc 420 is delivered to the master cylinder 14 by the operating rod 12. In an initial state in which the pedal 11 starts to be applied, the other end of the operating rod 12 may be separated from the reaction disc 420. As the pedal 11 is applied, the other end of the operating rod 12 moves forward toward the reaction disc 420.

At least part of the push rod 13 is inserted into the master cylinder 14. The push rod 13 reciprocates in a lengthwise direction of the master cylinder 14 within the master cylinder 14, and when the push rod 13 moves forward, it may pressurize a brake fluid stored in the master cylinder 14.

The master cylinder 14 is configured to hold a brake fluid within. The brake fluid within the master cylinder 14 is pressurized, and a hydraulic pressure used for braking is generated. The generated hydraulic pressure is transmitted to a plurality of wheel brakes (not shown).

The return spring 15 is disposed inside the master cylinder 14, and contracts or expands by reciprocating motion of the push rod 13. Preferably, the return spring 15 may be a coil spring. However, the present disclosure is not necessarily limited to this, and the return spring 15 may be a plate spring or be made of an elastic material such as rubber. Also, although not shown in this disclosure, the return spring 15 may be disposed inside a housing of the electric booster unit 20. The return spring 15 may be disposed inside the master cylinder 14 or inside the electric booster unit 20 so as to be compressed by part of a force transmitted by either or both of the operating rod 12 and the electric booster unit 20.

The electric booster unit 20 is configured to boost the driver's pedal effort. The electric booster unit 20 includes all or part of a motor 22, a gear device 24, a screw shaft 26, and a motor piston 28.

The motor 22 is configured to rotate forward or backward in response to a signal from the electric control unit 50.

The gear device 24 is configured to transmit a rotational torque of the motor 22 to the screw shaft 26. The gear device 24 includes all or part of a first gear 240, a second gear 242, and a third gear 244.

The first gear 240 receives the rotational torque transmitted from the motor 22 and transmits it to the second gear 242. The second gear 242 transmits the rotational torque transmitted from the first gear 240 to the third gear 244. The third gear 244 transmits the rotational torque transmitted from the second gear 242 to the screw shaft 26. The speed of rotation may be reduced or increased by a certain percentage while the rotational torque is transmitted to the first gear 240 to the third gear 244, based on the ratio of the number of teeth among the first to third gears 240 to 244.

The screw shaft 26 is configured to convert the rotational toque transmitted by the gear device 24 into linear motion. The screw shaft 26 includes all or part of a first shaft 260 and a second shaft 262.

The first shaft 260 rotates while restrained by the third gear 244. The second shaft 262 is configured to convert the rotating motion of the first shaft 260 into linear motion. Preferably, the first shaft 260 may be comprised of a pinion, and the second shaft 262 may be comprised of a rack. One end of the second shaft 262 is connected to the motor piston 28. Due to this, as the motor 22 is driven, the second shaft 262 moves forward toward the reaction disc 420 or moves backward, i.e., in the opposite direction.

The motor piston 28 reciprocates in the lengthwise direction of the master cylinder 14 by a force transmitted by a combination of the gear shaft 24 and the screw shaft 26. The motor piston 28 is configured in such a way that one side is compressed by the second shaft 262 and the other side compresses the reaction disc 420.

The motor piston 28 is disposed in proximity to the first shaft 260 if the pedal 11 is not pressed, that is, there is no braking request signal.

The housing 30 is formed to surround at least part of the pedal master unit 10, at least part of the electric booster unit 20, and at least part of the pedal feel generating unit 40. The housing 30 includes a spring mount 32.

The spring mount 32 is fixed to the housing 30, and at least part of the pedal spring unit 44 is attached to one side of the spring mount 32. The spring mount 32 is formed to support the pedal spring unit 44 when the pedal spring unit 44 is compressed by the driver's pedal effort.

When the pedal 11 is pressed by the driver, the pedal feel generating unit 40 provides a pedal feel to the driver. The pedal feel generating unit 40 includes all or part of a disc unit 42 and the pedal spring unit 44.

The disc unit 42 is configured to be compressed by one or more of the operating rod 12 and the motor piston 28. A reaction force to the pedal feel generated by the disc unit 42 is transmitted to the push rod 13. As the push rod 13 pressurizes the brake oil stored in the master cylinder 14 and at least part of the pressurized brake oil is delivered to a plurality of wheel brakes (not shown), a hydraulic braking force $F_{hyd}$ may be generated.

The disc unit 42 includes a reaction disc 420 and a reaction disc container 422.

The reaction disc 420 is configured to be compressed by the operating rod 12. When one end of the operating rod 12 is compressed by the force the driver applies on the pedal 11, the other end compresses the reaction disc 420.

Moreover, the reaction disc 420 is configured to be compressed by the motor piston 28. Meanwhile, FIG. 1 of the present disclosure illustrates that the reaction disc 420 and the motor piston 28 are in contact with each other even in the initial state. However, if no braking request signal is generated by the electric control unit 50, this may mean that the motor piston 28 is separated from the reaction disc 420.

Meanwhile, as the pedal 11 is pressed, an end of the operating rod 12 moves forward toward the reaction dic 420 and abuts the reaction disc 420. If the pedal 11 is pressed further, an outer circumference of the reaction disc 420 is compressed by the motor piston 28, and the central part of the reaction disc 420 is compressed by the operating rod 12. To this end, a longitudinal section of the motor piston 28 may be approximately annular, and the operating rod 12 may penetrate through an open central part of the motor piston 28. In this case, the operating rod 12 and the reaction disc 420 are coaxially arranged. However, the present disclosure is not limited to this, any braking system with a device capable of compressing the reaction disc 420 by applying the pedal 11 and driving the motor 22 may be included in this disclosure. For example, the outer circumference of the reaction disc 420 may be compressed by the operating rod 12, and the central part of the reaction disc 420 may be compressed by the motor piston 28. Even in this case, the operating rod 12 and the reaction disc 420 may be coaxially arranged.

The reaction disc 420 is made of a compressible material. For example, at least part of the reaction disc 420 may be made of a rubber material. When the reaction disc 420 is compressed by one or more of the operating rod 12 and the motor piston 28, a reaction force created by the compressing force is transmitted to the driver through the operating rod 12, and constitutes part of the driver's pedal feel. Hereinafter, the pedal force generated as the reaction disc 420 is compressed by an external force is referred to as $F_{RD}$.

The reaction disc container 422 is formed in such a way as to contain at least part of the reaction disc 420 in a space formed therewithin. When one side of the reaction disc container 422 is compressed by one or more of the operating rod 12 and the motor piston 28, the other side of the reaction disc container 422 compresses the push rod 13.

One side of the pedal spring unit 44 is connected to the operating rod 12, and the other side is connected to the spring mount 32. The pedal spring unit 44 generates a tensile force or compressing fore as the relative distance between the pedal 11 and the spring mount 32 increases or decreases. A reaction force created by the compression of the pedal spring unit 44 is transmitted to the driver through the operating rod 12, and constitutes part of the driver's pedal feel. Hereinafter, the pedal force generated as the reaction disc 420 is compressed by an external force is referred to as $F_{spring}$.

The pedal spring unit 44 includes a spring 440 and a damper 442. In this disclosure, the spring 440 and the damper 442 are illustrated as being connected in series but not necessarily limited to this, and the spring 440 and the damper 442 may be connected in parallel.

A total pedal force $F_{pedal}$ provided to the driver may be determined as the sum of the pedal force $F_{RD}$ generated by the reaction force to the compressing force of the disc unit 42 and the pedal force $F_{spring}$ generated by the reaction force to the compressing force of the pedal spring unit 44.

The electric control unit 50 generates a braking request signal based on a pedaling signal transmitted from a pedal travel sensor (not shown). The braking request signal is an electrical signal that allows at least part of a plurality of wheel brakes (not shown) to generate a braking force.

The electric control unit 50 calculates the total braking force $F_{total}$ required to brake the vehicle based on the pedaling signal. Also, the electric control unit 50 determines whether to use regenerative braking or not, and applies a regenerative braking force $F_{reg}$ and controls the electric booster unit 20 differently, depending on whether regenerative braking is used or not. Here, the total braking force required may be the sum of hydraulic braking force and regenerative braking force. A plurality of braking modes may be set. For example, the electric control unit 50 may brake the vehicle by setting a hydraulic braking mode which uses hydraulic braking force alone, a regenerative braking mode which uses regenerative braking force alone, and a cooperative braking mode which uses both hydraulic braking force and regenerative braking force.

FIG. 2 is a graph for explaining how the operation works when the braking system brakes the vehicle in a cooperative braking mode.

Although the electric control unit 50 may brake the vehicle by setting the braking mode to the hydraulic braking mode and the regenerative braking mode as explained above, FIG. 2 only illustrates the cooperative braking mode.

Upon receiving a braking signal, the electric control unit 50 calculates a corresponding total braking force required. After calculating the total braking force required, the electric control unit 50 calculates the hydraulic braking force and the regenerative braking force so as to meet the total braking force required, and accordingly brakes the vehicle. A regenerative braking interruption signal is turned ON after a certain period of braking time, and the electric control unit 50 performs control to decrease the regenerative braking force and increase the hydraulic braking force, from a first point in time X1 where the regenerative braking interruption signal is received.

The hydraulic braking force increases while the regenerative braking force decreases between the first point in time X1 and a second point in time X2. The amount of hydraulic braking force at the second point in time X2 may be equal or similar to the amount of total braking force required. After the second point in time X2, braking is performed using the hydraulic braking force alone.

FIG. 2 illustrates a process in which the electric control unit 50 receives a regenerative braking interruption signal during braking of the vehicle and decreases the regenerative braking force to 0 and increases the hydraulic braking force up to the total braking force required. Even if the electric control unit 50 changes the setting from the cooperative braking mode to the hydraulic braking mode, the braking system 1 may still operate as in the graph of FIG. 2. Also, although FIG. 2 illustrates that the regenerative braking force is greater than the hydraulic braking force in the cooperative braking mode, this is merely an example and they are not limited to what is illustrated in FIG. 2.

The hydraulic pressure in the master cylinder 14 drops suddenly due to a sudden rise in hydraulic braking force between the first point in time X1 and the second point in time X2. In this case, the pedal force is also lowered, and the driver may have an unnatural feel on the brake. The present disclosure involves a braking system 1 for minimizing such an unnatural feel, and a concrete method for this will be described in detail in the description of FIG. 3.

FIG. 3 is a cross-sectional view for explaining how the operation works when a regenerative braking interrupt signal is received in the cooperative braking mode of the braking system according to an embodiment of the present disclosure.

FIG. 3a is a view illustrating how the pedal 10 is applied by the driver when braking. When the pedal 10 is applied by the driver, the operating rod 12 compresses the reaction disc 420. The electric booster unit 20 operates as well to assist the driver's pedal effort and therefore compresses the reaction disc 420 together with the motor piston 28.

FIG. 3b is a view illustrating how the braking system 1 operates when the hydraulic pressure in the master cylinder 14 drops suddenly between the first point in time X1 and the second point in time X2. The braking system 1 has to raise the hydraulic braking force within a short time between the first point in time X1 and the second point in time X2. That is, it is necessary to supply brake oil to a plurality of wheel brake mechanisms in order to raise the hydraulic braking force. The brake oil is supplied to a plurality of wheel brake mechanisms through the master cylinder 14 from a reservoir (not shown). At this point, the amount of brake oil in the master cylinder 14 is decreased, and the hydraulic pressure in the master cylinder 14 drops suddenly. Due to the sudden drop in hydraulic pressure in the master cylinder 14, the driver's pedaling force is lowered, giving the driver an unnatural pedaling feel. To eliminate such an unnatural feel, the electric control unit 50 drives the motor 22 to move the motor piston 28 backward.

The electric control unit 50 calculates a first hydraulic pressure in the master cylinder 14 at the first point in time X1 and calculates a second hydraulic pressure in the master cylinder 14. Hydraulic pressures may be calculated by using a hydraulic measurement device (not shown) placed separately in the master cylinder 14. The electric control unit 50 may store data on the hydraulic pressure in the master cylinder 14 relative to a displacement of the motor piston 28. In this case, the electric control unit 50 may calculate the amount of hydraulic pressure in the master cylinder 14, not by using the hydraulic measurement device (not shown) but by using the displacement of the motor piston 28.

The electric control unit 50 may calculate the sudden drop in hydraulic pressure between the first point in time X1 and the second point in time X2 by using the difference between the first hydraulic pressure and the second hydraulic pressure. After calculating the sudden drop in hydraulic pressure, the displacement of the motor piston 28 relative to this sudden drop in hydraulic pressure may be calculated. Afterwards, the electric control unit drives the motor 22 to move the motor piston 28 backward by the calculated displacement.

As described above, the reaction disc 420 is made of an elastic material and therefore causes the operating rod 12 to compress the central part of the reaction disc 420 in such a manner as depicted in (b) of FIG. 3. As the motor piston 28 moves backward, the force compressing the reaction disc 420 decreases, which increases the force applied to the operating rod 12. Accordingly, even if the hydraulic pressure in the master cylinder drops suddenly, the driver will not have an unnatural pedaling feel by moving the motor piston 28 backward.

Figure 4:
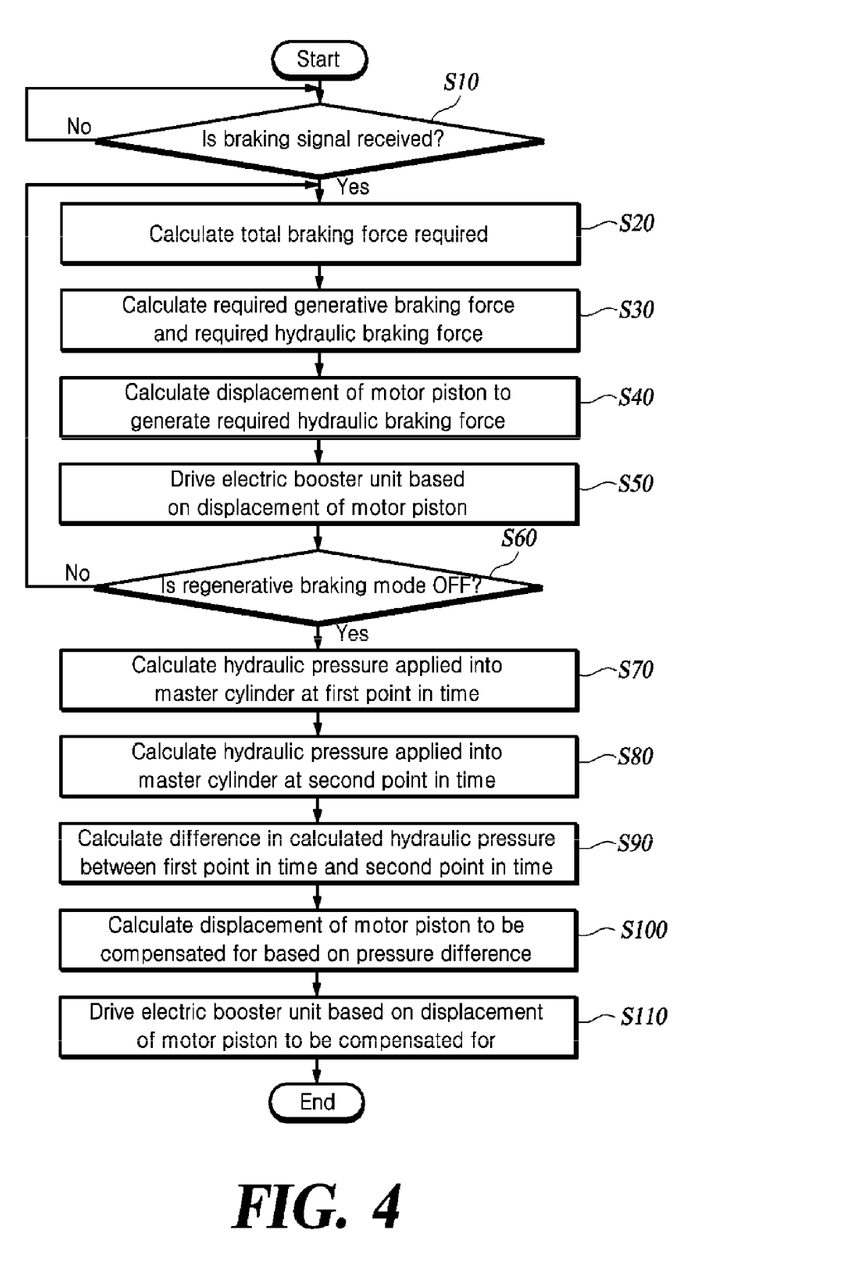
FIG. 4 is a flowchart of a method of controlling a braking system according to an embodiment of the present disclosure.

FIG. 4 is a flowchart of a method of controlling a braking system according to an embodiment of the present disclosure. FIG. 4 illustrates a flowchart of the cooperative braking mode, among the above-described hydraulic braking mode, regenerative braking mode, and cooperative braking mode. A method of braking when the electric control unit 50 sets the braking mode to the hydraulic braking mode or the regenerative braking mode will be omitted since it is apparent to those of ordinary skill in the art.

The electric control unit 50 determines whether a braking signal is received or not (S10). The electric control unit 50 does not perform the control shown in FIG. 4 until it receives a braking signal. The braking signal is generated when the driver applies the pedal 11 or when it is determined that the vehicle requires braking while autonomous driving.

If it is determined that a braking signal is received, the electric control unit 50 calculates a total braking force required (S20). The total braking force required is calculated based on a stroke length sensed by a pedal travel sensor. After calculating the total braking force required, the electric control unit 50 determines which mode to use for braking, among the hydraulic braking mode, the regenerative braking mode, and the cooperative braking mode. The description of FIG. 4 will be given on the assumption that the electric control unit 50 sets the braking mode to the cooperative braking mode to perform braking.

After calculating the total braking force required, the electric control unit 50 calculates required generative braking force and required hydraulic braking force (S30). Here, a braking force corresponding to the total braking force required needs to be generated by adding the required generative braking force and the required hydraulic braking force.

The electric control unit 50 calculates a displacement of the motor piston 28 which is required to generate the calculated required hydraulic braking force (S40). The electric control unit 50 may store the amount of hydraulic braking force generated relative to the displacement of the motor piston 28, in the form of a look-up table (LUT) or the like.

After calculating the displacement of the motor piston 28, the electric control unit 50 drives the electric booster unit 20 based on the displacement of the motor piston 28 (S50). That is, the electric control unit 50 sends a driving signal to the motor 22 of the electric booster unit 20 and performs control so as to move the motor piston 28 forward or backward by the calculated displacement. As the motor piston 28 moves forward toward the master cylinder 14, hydraulic pressure is supplied to a plurality of wheel brakes (not shown).

The electric control unit 50 determines whether the regenerative braking mode is turned OFF during braking in the cooperative braking mode (S60). That is, upon receiving a regenerative braking interruption signal, the electric control unit 50 determines that the regenerative braking mode is turned OFF.

If the regenerative braking mode is turned OFF, the electric control unit 50 calculates a first hydraulic pressure applied into the master cylinder 14 at a first point in time X1 where the regenerative braking interruption signal is received (S70). The electric control unit 50 may calculate hydraulic pressure by using a hydraulic measurement device (not shown) provided to measure the hydraulic pressure in the master cylinder 14, or may calculate hydraulic pressure by using data on the hydraulic pressure in the master cylinder 14 relative to the displacement of the motor piston 28 which is stored in a memory of the electric control unit 50.

The electric control unit 50 calculates a second hydraulic pressure applied into the master cylinder 14 at a second point in time X2 after a preset time interval from the first point in time X1 (S80). In this step, the electric control unit 50 calculates the hydraulic pressure in the master cylinder 14 by using a hydraulic measurement device (not shown). The second point in time X2 may be a point in time where the hydraulic braking force becomes equal to the total braking force required, but is not limited thereto.

After calculating the first hydraulic pressure and the second hydraulic pressure, the electric control unit 50 calculates the difference in calculated hydraulic pressure between the first point in time and the second point in time (S90). Next, the electric control unit 50 calculates the displacement of the motor piston 28 to be compensated for based on the pressure difference, by using the difference in calculated hydraulic pressure (S100). The displacement to be compensated for based on the pressure difference may be measured in advance by an experiment and stored in a memory in the form of a LUT.

The electric control unit 50 drives the electric booster unit 20 based on the displacement of the motor piston 28 to be compensated for (S110). The electric control unit 50 sends a control signal to the motor 22 to move the motor piston 28 backward in the opposite direction of the master cylinder 14, so that the pressure applied to the operating rod 12 is kept constant over a period of time between the first point in time and the second point in time.

What is claimed is:

1. A braking system configured to perform cooperative braking, a combination of regenerative braking and hydraulic braking, when braking a vehicle, the braking system comprising:
    a pedal master unit comprising a master cylinder and an operating rod configured to transmit a pedal effort generated by pressing a pedal to the master cylinder;
    an electric booster unit comprising a motor, a motor piston configured to compress the master cylinder, and a power transmission configured to convert a rotary motion of the motor into a linear motion of the motor piston;
    a reaction disc that generates a pedal force when compressed by at least one of the operating rod or the motor piston; and
    a controller that, upon receiving a regenerative braking interruption signal during the cooperative braking of the vehicle, senses a pressure change in the master cylinder and compensates for a displacement of the motor piston by an amount corresponding to the pressure change.

2. The braking system of claim 1, wherein, upon receiving the regenerative braking interruption signal, the controller calculates a first hydraulic pressure applied into the master cylinder at a first point in time where the regenerative braking interruption signal is received, calculates a second hydraulic pressure applied into the master cylinder at a second point in time after a preset time interval from the first point in time, and compensates for the displacement of the motor piston based on a difference between the first hydraulic pressure and the second hydraulic pressure.

3. The braking system of claim 2, wherein the amount of displacement of the motor piston is proportional to the difference between the first hydraulic pressure and the second hydraulic pressure.

4. The braking system of claim 1, wherein the power transmission comprises:
a gear unit that boosts torque of the motor;
a first screw shaft disposed to receive the torque from the gear unit; and
a second screw shaft disposed to receive a rotary motion of the first screw shaft and convert the rotary motion into a linear motion to compensate for the displacement of the motor piston.

5. The braking system of claim 1, wherein a central part of the reaction disc is compressed by the operating rod, and an outer circumference of the reaction disc is compressed by the motor piston.

6. A method of controlling a braking system configured to perform cooperative braking, a combination of regenerative braking and hydraulic braking, when braking a vehicle, the method comprising:
when a pedal is pressed, calculating, by a controller, a total braking force required to brake the vehicle based on a stroke of the pedal measured by a pedal travel sensor;
calculating, by the controller, a regenerative braking force and a hydraulic braking force based on the total braking force required and determining a displacement of a motor piston to generate the hydraulic braking force;
driving, by the controller, an electric booster unit based on the displacement of the motor piston;
determining, by the controller, whether the regenerative braking is finished or not; and
when the regenerative braking is determined to be finished, calculating, by the controller, a difference in hydraulic pressure in a master cylinder between a first point in time where the regenerative braking is finished and a second point in time which is after a preset time interval from the first point in time,
wherein the calculating a displacement of the motor piston comprises calculating the displacement of the motor piston to be compensated for based on the calculated difference in hydraulic pressure.

7. The method of claim 6, further comprising driving the electric booster unit based on the displacement of the motor piston to be compensated for.

8. The method of claim 6, wherein the hydraulic pressure in the master cylinder is calculated at the first point in time and the second point in time by using a hydraulic measurement device placed in the master cylinder.

9. The method of claim 6, wherein, at the first point in time, the amount of hydraulic pressure in the master cylinder is determined by using stored data on the amount of hydraulic pressure in the master cylinder relative to the displacement of the motor piston.

10. The method of claim 7, wherein the amount of displacement of the motor piston to be compensated is proportional to the calculated difference in hydraulic pressure.

* * * * *